United States Patent [19]

Kaji

[11] 4,387,588

[45] Jun. 14, 1983

[54] KNOCKING DETECTOR OF AN INTERNAL COMBUSTION ENGINE

[75] Inventor: Kiyokane Kaji, Toyota, Japan

[73] Assignee: Toyota Jidosha Kogyo Kabushiki Kaisha, Toyota, Japan

[21] Appl. No.: 258,574

[22] Filed: Apr. 29, 1981

[30] Foreign Application Priority Data

May 19, 1980 [JP]  Japan .............................. 55-68572[U]

[51] Int. Cl.$^3$ ............................................ G01L 23/22
[52] U.S. Cl. .................................................... 73/35
[58] Field of Search ...................... 73/35; 123/425, 435

[56] References Cited

U.S. PATENT DOCUMENTS 4,002,155  1/1977  Harned et al. .

FOREIGN PATENT DOCUMENTS 52-87537  7/1977  Japan .

Primary Examiner—James J. Gill
Attorney, Agent, or Firm—Cushman, Darby & Cushman

[57] ABSTRACT

A knocking detector compares an output of a knocking sensor with a reference level derived by integrating and amplifying the output of the knocking sensor to produce a knocking signal. An amplification factor of the amplifier is changed between a low engine rotation speed region and a high engine rotation speed region such that the amplification factor is lower than that at low engine rotational speeds. As a result, the ability to detect knocking is not lowered at high engine rotational speeds so that knocking can be properly detected under all running conditions.

3 Claims, 5 Drawing Figures

KNOCKING DETECTOR OF AN INTERNAL COMBUSTION ENGINE

BACKGROUND OF THE INVENTION

1. Field of the Invention

The present invention relates to a knocking detector of an internal combustion engine, and more particularly to an improvement in a knocking detector of an internal combustion engine suitable for use with an ignition timing control device for retarding ignition timing based on detected knocking.

2. Description of the Prior Art

Since engine knock is a destructive phenomenon which may destroy the engine in the worst case, ignition timing has been retarded by a certain predetermined degree from an ignition timing which causes knocking. However, since it is undesirable with respect to fuel consumption to retard the ignition timing from the critical knocking ignition timing, it has been proposed to control ignition timing to the critical knocking ignition timing (that is, the most advanced angle which does not cause knocking) employing feedback. (See Japanese Published Unexamined Patent Application 52-87537).

In the proposed ignition timing control device, the knocking of the engine is monitored and the ignition timing is feedback controlled such that if the knocking is detected the ignition timing is retarded and if the knocking is not detected the ignition timing is advanced to the critical knocking ignition timing. Referring to FIG. 1, the knocking detection device comprises a knocking detection circuit 11 including a knocking sensor 10 which may be an acceleration pick-up or a microphone for detecting vibration in the engine body or sound waves generated by the vibrations and transducing it to an electrical signal, a high-pass filter 12 for blocking the low frequency components in the output of the knocking sensor 10, a signal offset circuit 14 for offsetting the output of the high-pass filter 12 by a predetermined level, a masking circuit 16 for masking a portion of the output of the signal offset circuit 14 to prevent malfunction of the knocking detection device due to an external noise, a half-wave rectifying circuit 18 for half-wave rectifying the output of the high-pass filter 12, an integration circuit 20 and an amplifier circuit 22 for producing a reference level signal corresponding to an engine dark noise level from the output of the half-wave rectifying circuit 18, and a comparator circuit 24 for comparing the output of the masking circuit 16 with the reference level output of the amplifier circuit 22 to determine the occurrence of knocking when the output of the masking circuit 16 exceeds the reference level, and an ignition timing control circuit 26 which receives the output of the comparator circuit 24 as a knocking signal.

In such a knocking detector, the knocking signal is produced when the output of the knocking sensor 10 exceeds the reference level corresponding the engine dark noise level derived by integrating and amplifying the output of the knocking sensor 10. As compared with the case where the reference level is fixed independently of engine dark noise level, the knocking is more exactly determined while the engine is rotating both at low speeds and at high speeds. However, the reference level which directly corresponds to the engine dark noise level increases more rapidly at high engine rotation speeds, as shown by a broken line A in FIG. 2, while the output of the knocking sensor caused by knocking vibrations does not increase significantly at high engine rotation speeds. As a result, the reference level increases much more than the knocking sensor output does during high loads and high rotational speeds. Thus, if the integration time constant and amplification factor of the knocking detection circuit are improperly set, the reference level will be larger than the output of the knocking sensor 10 produced by knocking vibrations so that knocking cannot be detected at all. In such a case, the ignition timing becomes too advanced at high engine rotational speeds as shown by a broken line B in FIG. 3 so that it is more advanced than the ignition timing that would be determined by a governor on the distributor shown by a solid line C in FIG. 3. This may result in engine damage.

In order to resolve the above difficulties, it has been proposed to set the amplification factor for the amplifier low in order to establish a relatively low reference level. In such a case, however, knocking is detected erroneously so that the amount of retardation is too large, causing high fuel consumption and an exhaust gas temperature rise.

It has also been proposed to lower the reference level upon the detection knocking so that the ability to detect the knocking is enhanced when knocking occurs. However, this poses a problem of complexity in the construction of the knocking detection circuit.

SUMMARY OF THE INVENTION

The present invention is intended to overcome the difficulties encountered in the prior art devices. Thus, it is an object of the present invention to provide a knocking detector for an internal combustion engine in which the ability to detect knocking is not lowered at high engine rotational speeds and which can properly detects knocking under all running conditions.

In order to achieve the above object, in accordance with the present invention, there is provided a knocking detector comprising a knocking sensor for detecting engine body vibrations or sound waves generated by the vibrations and transducing them into to an electrical signal and a knocking detection circuit for producing a knocking signal when the output of the knocking sensor exceeds a reference level corresponding to an engine dark noise level derived by integrating and amplifying the output of the knocking sensor. The amplification factor of an amplifier for amplifying the output of the knocking sensor to the reference level is variable so that a low amplification factor is established at high engine rotational speed.

BRIEF DESCRIPTION OF THE DRAWINGS

The abovementioned features and objects of the present invention will become more apparent by reference to the following description taken in conjunction with the accompanying drawings, wherein like referenced numerals denote like elements and in which.

DETAILED DESCRIPTION OF THE PREFERRED EMBODIMENTS

Figure 4:
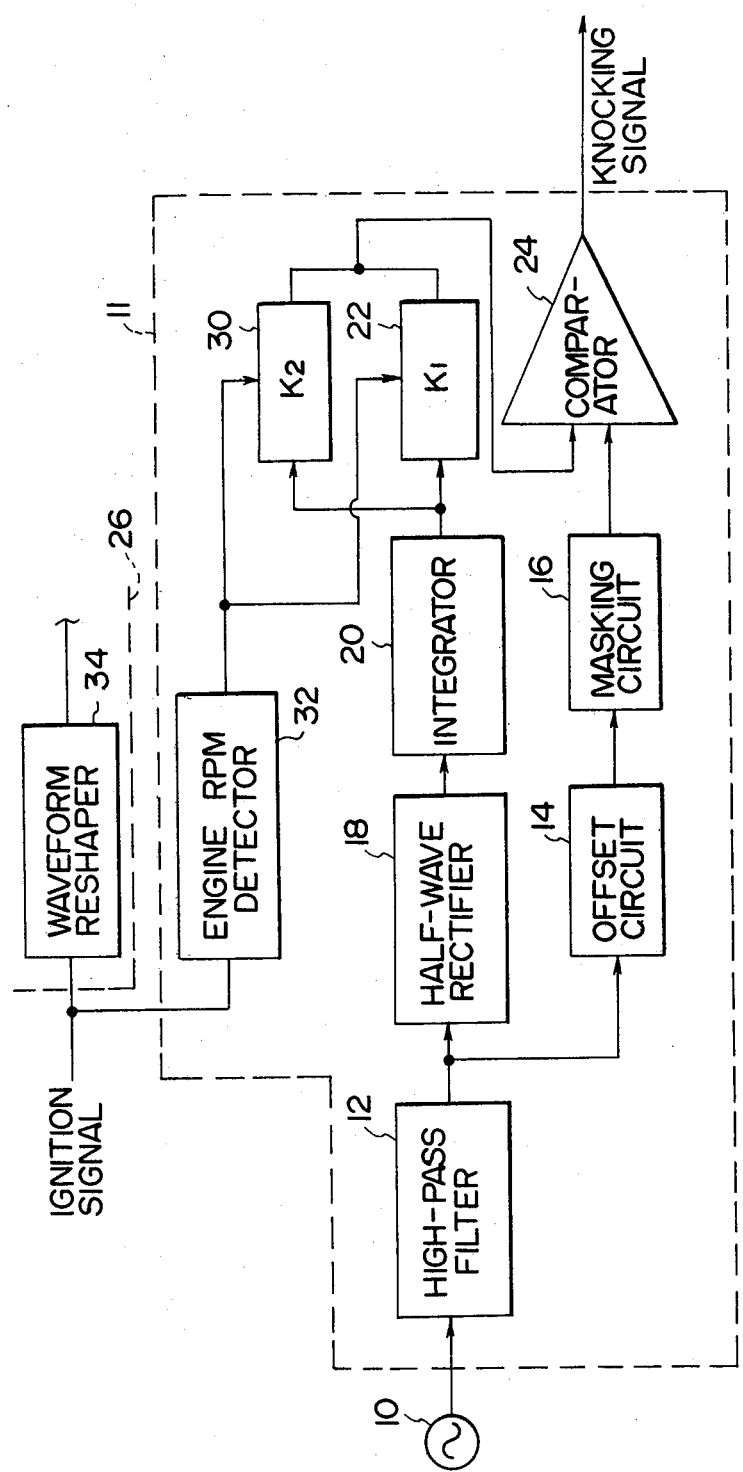
FIG. 4 shows a block diagram of an embodiment of a knocking detector of an internal combustion engine in accordance with the present invention.

Referring to the accompanying drawings, the preferred embodiments of the present invention will now be explained in detail. In the embodiment shown in FIG. 4, a knocking detector having an amplifier circuit 22 of an amplification factor of $K_1$ includes a second amplifier circuit 30 having a smaller amplification factor $K_2$ than $K_1$ in parallel with the amplifier circuit 22. In response to an output of an engine rotation speed detection circuit 32 which detects the engine rotation speed based on an ignition signal, the output of the amplifier circuit 22 having the amplification factor $K_1$ is applied to a comparator 24 in a low engine rotation while the output of the second amplifier circuit 30 having the amplification factor $K_2$ is applied to the comparator 24 in a high engine rotation. In FIG. 4, numeral 34 denotes a waveform reshaper circuit which is a portion of an ignition timing control circuit 26. The other elements are identical to the corresponding ones in the prior art device and hence they are not discussed here.

Figure 5:
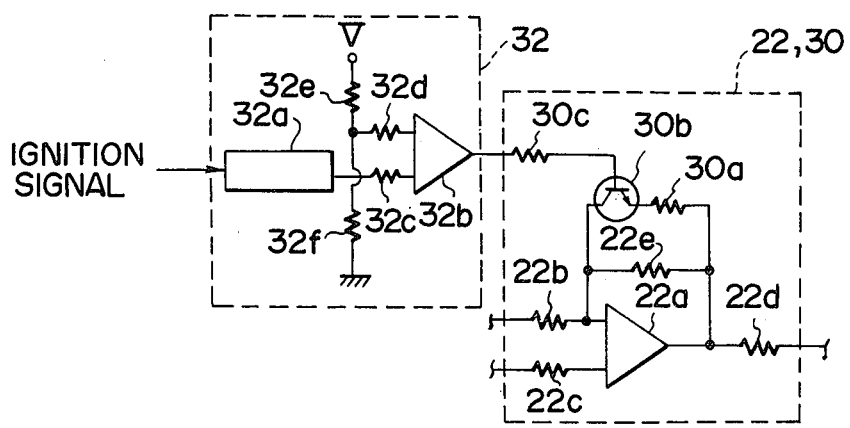
FIG. 5 shows an electrical circuit diagram of a major portion of the embodiment of FIG. 4.

As shown in detail in FIG. 5, the amplifier circuits 22 and 30 comprise an operational amplifier 22a, input resistors 22b and 22c of the operational amplifier 22a, and output resistor 22d of the operational amplifier 22a, a first feedback resistor 22e of the operational amplifier 22a, a second feedback resistor 30a of the operational amplifier 22a, a switching transistor 30b for connecting or disconnecting the second feedback resistor 30a in accordance with an output of the engine rotation speed detection circuit 32 and an input resistor 30c of the switching transistor 30b.

The engine rotation speed detection circuit 32, as shown in FIG. 5, comprises a frequency-voltage conversion circuit 32a for converting an ignition signal applied in the form of a pulse signal to an analog voltage, an operational amplifier 32b functioning as a comparator, input resistors 32c and 32d of the operational amplifier 32b, and dividing resistors 32e and 32f for establishing a reference voltage for the operational amplifier 32b.

The operation is now explained. When the engine rotation speed is low so that the output voltage of the frequency-voltage conversion circuit 32a of the engine rotation speed detection circuit 32 is lower than the reference voltage determined by the dividing resistors 32e and 32f, the switching transistor 30b of the amplifier circuits 22 and 30 is non-conductive. Accordingly, the amplification factor of the operational amplifier 22a is expressed by:

$$K_1 = 1 + (R_2/R_1) \qquad (1)$$

where $R_1$ is the resistance of the input resistor 22b and $R_2$ is the resistance of the feedback resistor 22e.

As a result, the amplification factor of the amplifier circuits 22 and 30 is $K_1$ and the output of the knocking sensor is amplified by the factor of $K_1$ to produce the reference level to detect the knocking in the same manner as in the prior art.

In the high engine rotation speed region in which the output voltage of the frequency-voltage conversion circuit 32a of the engine rotation speed detection circuit 32 exceeds the reference voltage determined by the dividing resistors 32e and 32f, the output of the operational amplifier 32b is up and the switching transistor 30b is rendered conductive. Accordingly, the resistance of the feedback resistor of the operational amplifier 22a of the amplifier circuits 22 and 30 is equal to a resultant resistance of the first and second feedback resistors 22e and 30a. Accordingly, the amplification factor $K_2$ of the amplifier circuits 22 and 30 is expressed by:

$$K_2 = 1 + [(R_2 \cdot R_3)/(R_2+R_3)] \cdot (1/R_1) \qquad (2)$$

where $R_3$ is the resistance of the second feedback resistor 30a.

Figure 1:
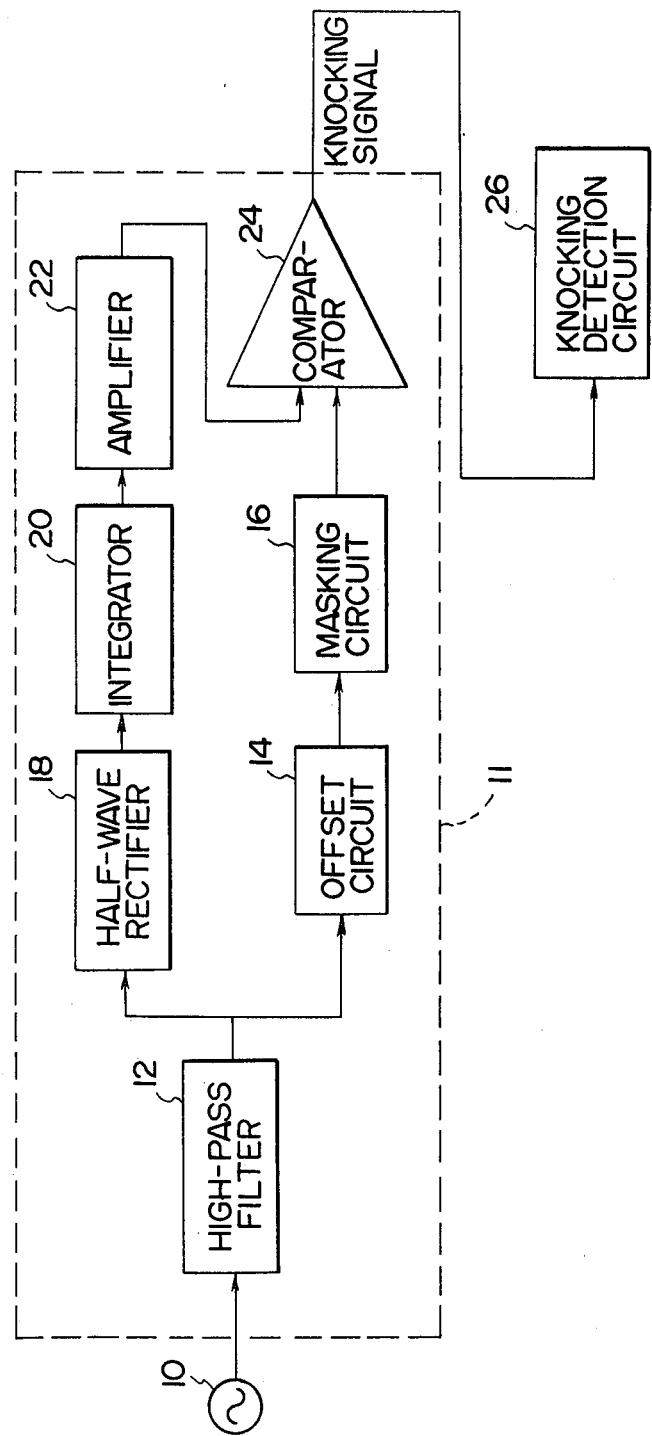
FIG. 1 shows a block diagram of a construction of a prior art knocking detector of an internal combustion engine.
Figure 2:
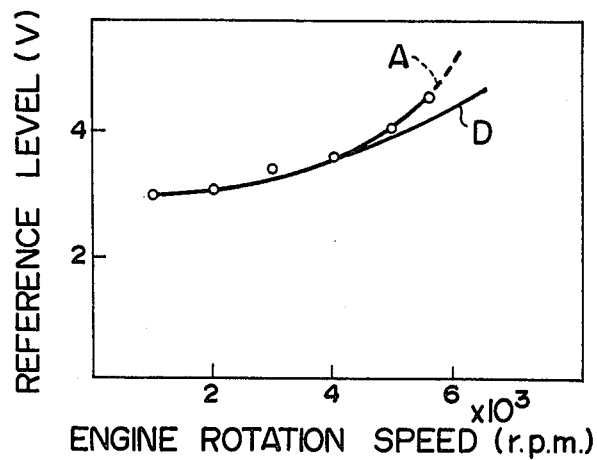
FIG. 2 shows a chart illustrating a relationship between an engine rotation speed and a reference level for detecting the knocking in the prior art and an embodiment of the present invention.
Figure 3:
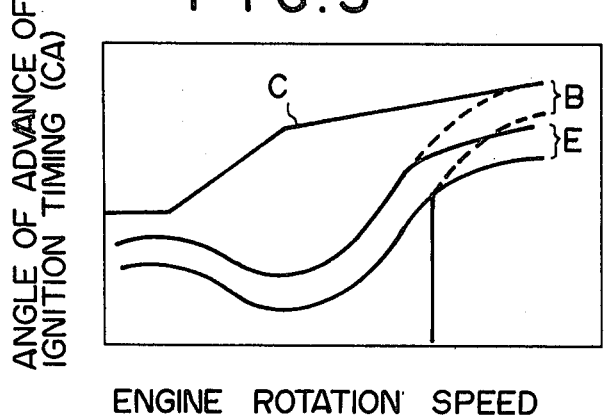
FIG. 3 shows a chart illustrating ignition timing control characteristics in the prior art and the embodiment of the present invention.

Thus, the amplification factor $K_2$ of the amplifier circuits 22 and 30 in the high engine rotation speed region is smaller than the amplification factor $K_1$ in the low engine rotation speed region. The relationship between the engine rotation speed and the reference level is shown by a solid line D in FIG. 2. Thus, the reference level corresponding to the engine dark noise level does not abnormally increase in the high engine rotation speed region and the knocking can be determined in the high engine rotation speed region as well. An ignition timing control characteristic is shown by a solid line E in FIG. 3. Thus, the problem of break of engine due to overadvancement of the ignition timing in the high engine rotation speed can be prevented.

As described hereinabove, in accordance with the present invention, the ability of detecting the knocking is not lowered in the high engine rotation speed and hence the knocking can be properly detected under all running conditions.

From the foregoing description, it should be apparent to those skilled in the art that the above-described embodiment is but one of many possible specific embodiments which can represent the applications of the principles of the present invention. Numerous and varied other arrangements can be readily devised by those skilled in the art without departing from the spirit and scope of the invention.

What is claimed is:

1. A knocking detector of an internal combustion engine comprising:

a knocking sensor for detecting engine vibrations and generating an output signal related thereto;

an integration circuit for integrating said output signal;

an engine rotation speed detection circuit for generating a speed signal when the engine rotates at a high speed;

an operational amplifier responsive to said integrated output signal;

a first feedback resistor connected between input and output terminals of said operational amplifier;

a second feedback resistor connected in parallel with said first feedback resistor;

a switching transistor having a collector and an emitter connected in series with said second feedback resistor, said switching transistor being responsive to said speed signal to turn on said transistor when the engine rotates at a high speed to decrease the gain associated with said operational amplifier; and a knocking detection circuit for comparing the output signal of said knocking sensor with an output signal of said operational amplifier to produce a knocking signal when the output signal of said knocking sensor exceeds the output signal of said operational amplifier.

2. A knocking detector of an internal combustion engine comprising:

a knocking sensor for detecting engine vibrations and generating an output signal related thereto;

a high-pass filter for blocking a low frequency component of said output signal;

a half-wave rectifier circuit for half-wave rectifying said filtered output signal;

an integration circuit for integrating an output signal of said half-wave rectifier circuit;

an engine rotation speed detection circuit for detecting an engine rotation speed based on an ignition signal and generating a speed signal when the engine rotation speed exceeds a predetermined rotation speed;

an operational amplifier responsive to an output of said integration circuit;

a first feedback resistor connected between an input terminal and an output terminal of said operational amplifier;

a second feedback resistor connected in parallel with said first feedback resistor;

a switching transistor having a collector and an emitter connected in series with said second feedback resistor, and a base responsive to said speed signal to turn on said transistor in response to said speed signal to decrease the gain associated with said operational amplifier;

a signal offsetting circuit for offsetting the output signal through said high-pass filter by a predetermined level;

a masking circuit for masking a portion of the output signal through said signal offsetting circuit; and a knocking detection circuit for comparing an output signal of said masking circuit with an output signal of said operational amplifier to produce a knocking signal when the output signal of said masking circuit exceeds the output signal of said operational amplifier.

3. A knocking detector of an internal combustion engine according to claim 1 or 2 wherein said engine rotation speed detection circuit includes:

a frequency-voltage coversion circuit for converting an ignition signal to a voltage signal;

a dividing resistor for establishing a reference voltage; and an operational amplifier for comparing the output of said frequency-voltage conversion circuit with said reference voltage to produce a signal when the output of said frequency-voltage conversion circuit exceeds said reference voltage.

* * * * *